(12) United States Patent
Gomez Arzapalo Varnier et al.

(10) Patent No.: US 12,064,904 B2
(45) Date of Patent: Aug. 20, 2024

(54) ENTOMOLOGICAL TAXIDERMY PROCESS TO REINFORCE THE EXOSKELETON OF COLLEOPTERA AND MINIMIZE THE FRAGILITY OF A SPECIMEN FOR ITS LATER USE IN DECORATIVE APPLICATIONS

(71) Applicants: Johan Gomez Arzapalo Varnier, Estado de México (MX); Fernanda Martinez De Alva, Estado de México (MX)

(72) Inventors: Johan Gomez Arzapalo Varnier, Estado de México (MX); Fernanda Martinez De Alva, Estado de México (MX)

(*) Notice: Subject to any disclaimer, the term of this patent is extended or adjusted under 35 U.S.C. 154(b) by 774 days.

(21) Appl. No.: 16/972,944

(22) PCT Filed: Aug. 28, 2019

(86) PCT No.: PCT/MX2019/000094
§ 371 (c)(1),
(2) Date: Dec. 7, 2020

(87) PCT Pub. No.: WO2020/046103
PCT Pub. Date: Mar. 5, 2020

(65) Prior Publication Data
US 2021/0307315 A1    Oct. 7, 2021

(30) Foreign Application Priority Data

Aug. 31, 2018 (MX) .................. MX/a/2018/010520

(51) Int. Cl.
*B29C 33/38* (2006.01)
*B29C 44/12* (2006.01)
*G09B 23/36* (2006.01)

(52) U.S. Cl.
CPC .......... *B29C 33/3878* (2013.01); *G09B 23/36* (2013.01); *B29C 44/12* (2013.01)

(58) Field of Classification Search
CPC ...................................................... G09B 23/36
USPC ................................. 434/86, 295, 296, 297
See application file for complete search history.

(56) References Cited

U.S. PATENT DOCUMENTS

| 2,169,811 | A | * | 8/1939 | Nevison | ................. | G09B 23/36 |
| | | | | | | 434/296 |
| 3,848,346 | A | * | 11/1974 | Mackey | .............. | G09B 23/306 |
| | | | | | | 434/296 |
| 4,205,059 | A | * | 5/1980 | von Hagens | ............. | A01N 3/00 |
| | | | | | | 435/40.52 |
| 4,789,341 | A | * | 12/1988 | Czyzewski | ............ | G09B 23/36 |
| | | | | | | 434/296 |
| 9,607,529 | B2 | * | 3/2017 | Lennard | ................. | G09B 23/36 |

* cited by examiner

*Primary Examiner* — Joseph B Baldori
(74) *Attorney, Agent, or Firm* — ArentFox Schiff LLP (57) ABSTRACT

The present invention provides a mixture that serves for the preservation of Coleoptera to preserve its exoskeleton and its ornamental appearance; reinforce the exoskeleton of the coleopterous to minimize their fragility; improve the preservation of the insect by making an internal preparation that prevents rupture of the exoskeleton caused by blows, manipulation or pressure on it.

8 Claims, 9 Drawing Sheets

ENTOMOLOGICAL TAXIDERMY PROCESS TO REINFORCE THE EXOSKELETON OF COLLEOPTERA AND MINIMIZE THE FRAGILITY OF A SPECIMEN FOR ITS LATER USE IN DECORATIVE APPLICATIONS

CROSS-REFERENCE TO RELATED APPLICATIONS

This application is a National Stage entry of International Application No. PCT/MX2019/000094, filed on Aug. 28, 2019, which claims priority to Mexican Patent Application No. MX/a/2018/010520, filed on Aug. 31, 2018. The disclosures of the priority applications are hereby incorporated in their entirety by reference.

FIELD OF THE INVENTION

The present invention belongs to the field of entomological taxidermy processes to reinforce the exoskeleton of coleoptera.

BACKGROUND OF THE INVENTION

The present invention is related to the process of traditional Asian art ("Beetlewing art") that uses different parts of insects known as "jewel beetles" (Coleoptera of the Buprestidae family) used in decoration of textiles, jewelry and decorative art, to the same as in religious precincts.

Through the process claimed by the present invention, the preparation of a mixture is described with which the interior of the insect is filled avoiding a fracture and making it possible to use it harshly in jewelry and ornamental applications, as well as in any other decorative application. In addition, by creating an amalgam that resides within the exoskeleton of the insect, it allows the artistic use of the coleopterous without damaging its exterior and thus maintaining its color, appearance and natural aesthetics intact.

The use of this mixture inside the insect prevents the production and reproduction of fungi that jeopardizes the exoskeleton ability to retain its color and hardness.

Chinese patent application CN104872109 describes a method of preparing an animal sample. The method comprises the following steps: (1) treating a sample material: selecting an animal that dies naturally as a sample material, filling cotton in the nostrils, oral cavity and anus of the animal, carrying out cryopreservation after ventilation and after 6-7 hours, removing the animal and naturally thawing the animal; (2) carry out taxidermy comprising taxidermy on the chest, taxidermy on the leg, taxidermy on the tail, taxidermy on the back of the wing, taxidermy on the neck and sole, and taxidermy on the head; (3) prepare the taxidermal animal in a model:sculpting a cystosepiment in a 1:1 prosthesis model, support the skeleton of the wing, tail and both legs with cables, smearing antiseptic medicine on the inner side of the skin, fixing the conductive cables in the skeleton of the head to tie the neck and fix the cables in the neck and the cables in the wings and legs in the prosthesis; (4) dress the model: restore the original ecological appearance and place the dressed model in a shady, cool and ventilated place. However, the described method does not describe the process that the present invention intends to protect.

US patent U.S. Pat. No. 4,752,229 describes a process for preparing quantities of a realistic artificial fish head having details of the inner mouth for taxidermy purposes comprising:

A. To the surface of a previously prepared room temperature vulcanizing silicone rubber composition one-piece mold for fish heads, said mold being prepared by (a) inserting g into a container containing a room temperature vulcanizable silicone rubber composition a fish head master for a depth such that at least the entire length of the head of said fish head master is below the surface of said composition, (b) polymerization of said composition, and c) removing said fish head master to get a permanent mold to mold fish heads. Apply a thin coating of a catalyzed crosslinkable liquid polymer and allow it to solidify, said catalyst being present in an amount sufficient to achieve rapid crosslinking of all the polymer, B. Application of a layer of said crosslinkable liquid polymer containing fiberglass chains, and C. While said mold continues to count, it maintains a substantial amount of the heat generated by said crosslinking, eliminating the resulting fish head from said mold.

U.S. Pat. No. 4,752,229 employs a vulcanizable silicone rubber composition and mold, while the present invention employs a marble-cellulose powder-composition and an enamel solution.

OBJECT OF THE INVENTION

The object of the present invention is to provide a cellulose and enamel mixture and another marble powder and enamel mixture that serves for the preservation of Coleoptera of the Buprestidae family to preserve its exoskeleton and its ornamental appearance.

Another object of the present invention is to reinforce the exoskeleton of the coleoptera to minimize their fragility. The purpose is to improve the preservation of the insect by making an internal preparation that prevents the exoskeleton from breaking due to blows, manipulation or pressure on it.

Another object of the present invention is to provide a Coleoptera of the Buprestidae family to be used in decorative applications such as jewelry.

DESCRIPTION OF THE INVENTION

In the present invention a process is described by means of which the exoskeleton of a coleopterous maintains the rigidity and firmness necessary to be manipulated without suffering any damage and maintaining its ornamental appearance.

For carrying out the present invention are used:

Specimen of dry Coleoptera of the Buprestidae family.

Separation, removal and filling tool that can be made of wood or polymer material of the type of a toothpick, since it facilitates the insertion of the material into the exoskeleton so that it does not cause any damage.

Cellulose, which can be thin and soft sheet of paper, toilet paper or similar, cellulose pulp, among others, without being limiting.

Marble Powder.

Transparent enamel solution containing butyl acetate, ethyl acetate, isopropyl alcohol, copolymer hydrate, triphenyl phosphate, isobutanilic pentanyl, sterialconium, hectorite, nitrocellulose, formaldehyde, diacetone alcohol, citric acid, benzophenone, titanium dioxide.

Cotton isotopes, toothpicks with cotton material tip.

Pink Aniline (vegetable) solution, glycerin, mineral oil, butyl acetate.

Figure 1:
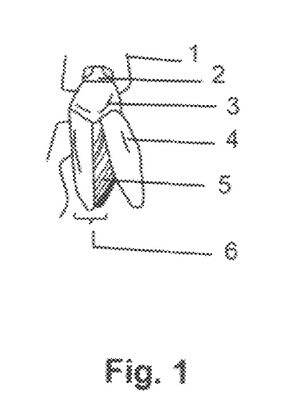
FIG. 1 shows the different parts of a coleopterous:
1—Leg
2—Head
3—Thorax
4—Elytra
5—Wings
6—Abdomen

Process:

FIG. 1 of the present invention shows the different parts of the exoskeleton of a Coleopterous of the Buprestidae family, specifically of a beetle which is going to be subjected to a process to improve its resistance and not suffer damage when manipulated.

Figure 2:
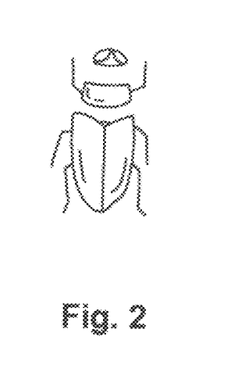
FIG. 2 shows the three sections into which a coleopterous is sectioned:
Head
thorax
Abdomen

Step I: Sectioning
1—From a dry Coleoptera specimen of the Buprestidae family, separate the specimen into two simple sections respecting the morphology where the tissue joins the exoskeleton, ending with two parts:
Thorax (3)
Abdomen (6)
2—As shown in FIG. 2, with the help of the separation tool such as a wooden toothpick, insert through the inside of the thorax and with a little pressure separate the head from the thoracic section.

Figure 3:
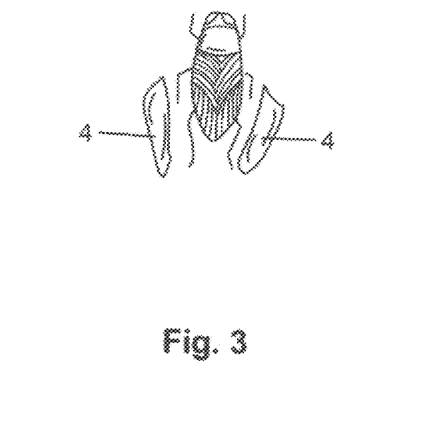
FIG. 3 shows the separation of the elytra from the upper abdomen.
Figure 4:
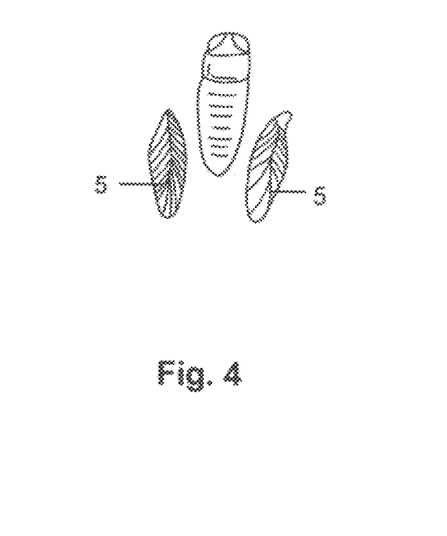
FIG. 4 shows the wings separation.

This will give us a total of three separate sections of the Coleopterous of the Buprestidae family:
Head (2)
Thorax (3)
Abdomen (6)
3—Separate the elytra (4) from the upper abdomen as shown in FIG. 3 and remove the wings (5) as shown in FIG. 4, in order to leave the abdomen ready to undergo the process of removal and subsequent filling.

The sections at the end of step I must be:
Head (2)
Thorax (3)
Abdomen (6)
Elytra (4)

Step II: Removal of Entrails.

With the help of the remover tool, remove the internal tissue of the three sections of the exoskeleton, this tissue is characterized by being the soft and dry part of the coleopterous, which will be extracted in powder form, the removal must be sufficient and taking the precaution of not perforating the exoskeleton.

Figure 5:
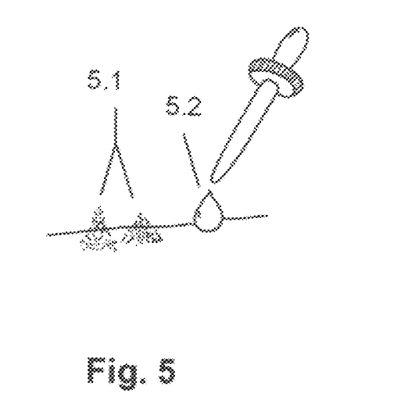
FIG. 5 shows the preparation of the marble powder and enamel mixture. Element 5.1 is marble powder and element 5.2 is enamel.
Figure 6:
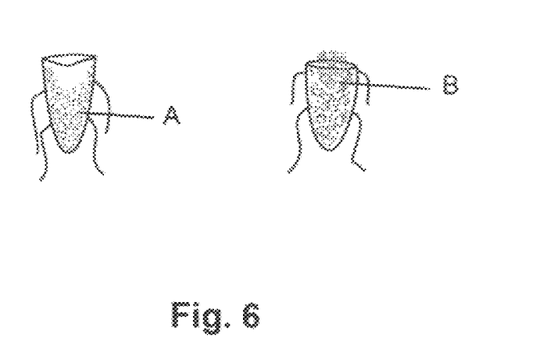
FIG. 6 shows how far the abdomen is filled with the marble powder and enamel mixture (A), as well as how the abdomen is filled with the cellulose and enamel mixture (B)
Figure 7:
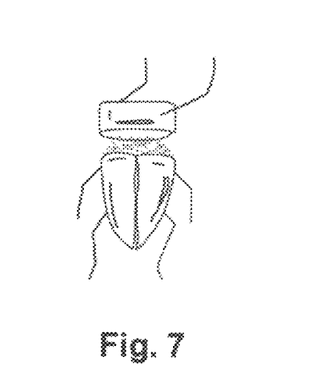
FIG. 7 shows how the thorax (3) is mounted to the abdomen (6).
Figure 8:
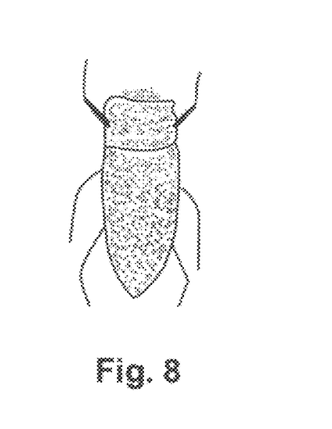
FIG. 8 shows how the thorax is filled with the marble powder and enamel mixture and the cellulose and enamel mixture.
Figure 9:
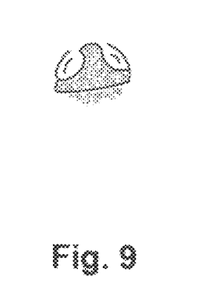
FIG. 9 shows the filling of the head with the cellulose and enamel mixture.

Step III: Filling and assembly
1—Mix two parts of marble powder (FIG. 5/5.1) for one of enamel (FIG. 5/5.2) until making a thick mixture (A), that is, the ratio is 3:2. Fill ¾ of the inside of the insect abdomen with the mixture, the quantity to be introduced should be enough not to leave empty spaces (FIG. 6 item A).
2—After the introduction of the marble powder and enamel mixture, the cellulose and enamel mixture will be introduced to the different parts of the exoskeleton through the entrance holes of each section of the Coleoptera of the Buprestidae family, the size of the cellulose should be such that it can be inserted through the holes.
3—Prepare a mixture of cellulose with the enamel (B) to be introduced into the exoskeleton.
4—Fill with the cellulose and enamel mixture (FIG. 6 element B) until filling at least ¼ of the abdomen remaining space and until the mixture is exposed (FIG. 6 element B) to be able to assemble the next section, the thorax (3) and in this way the parts are joined.
5—Mount the thorax (3) to the abdomen (6), the union of the two parts of exoskeleton is achieved by the exposed cellulose and enamel mixture (FIG. 7).
6—Once the abdomen (6) and the thorax (3) are joined, fill ⅔ of the thorax (3) with marble powder and enamel (FIG. 8) and fill the remaining space ¼ with a cellulose and enamel mixture; leaving a sufficient amount exposed so that the thorax (3) can fit with the head (2).
7—Fill the head (2) with a cellulose and enamel mixture until a sufficient quantity is exposed to fit with the thorax (FIG. 9).
8—Fit the insect head (2) with the thorax (3) and press with slight force joining the three parts at least 10 to 60 seconds, preferably 45 seconds.

Figure 10:
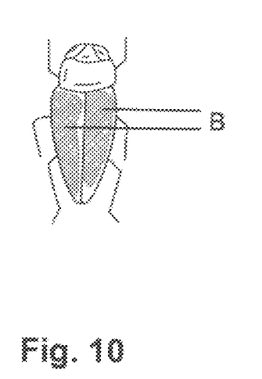
FIG. 10 shows the use of thin sheets of paper soaked in enamel (B), placed in layers in the upper abdomen where the wings were and emulating the thickness of the wings.

Step IV: Reincorporation of the Elytra
1—Use the cellulose and enamel mixture (FIG. 10 element B), place in layers in the upper abdomen where the wings were (5) and emulate the thickness of these, avoiding lateral overflow due to excess mixture.

2—Reincorporate the elytra (4) on the abdomen (6), respecting the initial anatomy of the insect.

Step V: Drying

Once the assembly process is finished, the drying step follows, which is carried out between 1 to 7 days, preferably 5 days, for the correct drying of the marble powder and enamel mixture (A) and the cellulose and enamel mixture (B) inside the exoskeleton.

Step VI: Removal of limbs

This step is optional and is performed by applying light force on the extremities to manually remove the anterior, medium and posterior limbs.

Step VII: Final Cleaning

1—Immerse the isotope in the pink aniline (vegetable), glycerin, mineral oil, butyl acetate solution and rub the joints and any part where there is excess enamel, this can be identified by its opacity effect on the exoskeleton of the Coleoptera of the Buprestidae family.

2—With the help of the removal tool, can be removed the excess of paper mixture that could be protruding from the joints, previously rubbing with the pink aniline (vegetable) solution, glycerin, mineral oil, butyl acetate and the isotope to soften it and to achieve the correct removal.

EXAMPLES

Ten coleopterous were analyzed, four without filling and six with different types of filling, to evaluate the force measured in g that they resist; Given the difference in sizes and shapes of the samples, the hardness measured in g·s and the approximate volume of the abdomen of each sample were calculated to obtain a relationship between these characteristics, finding that the samples with filling presented considerably greater resistance than those without filling; analyzes were performed using the TA. XT Plus® Texture Analyzer from Stable Micro Systems®.

The hardness is a physical property of the materials t consists of the resistance to undergo a physical alteration, such as scratches or penetration, so it relates to rupture; the harder a material is, the stronger it will be.

Methodology

I. Identification and Photographic Record:

The specimens were coded and photographed according to the number with which they had been identified since shipment, with the description shown below:

1—Three Coleoptera filled with cellulose and varnish
2—An unfilled Coleopterous
3—Two unfilled Coleoptera
4—A Coleopterous filled without filling (sic)
5—Coleopterous filled with quick-drying mineral modeling paste
6—Coleopterous filled with marble dust and varnish
7—Coleopterous filled with acrylic. Those packages with 2 or 3 individuals, were assigned with letters a, b and even c, as appropriate.

II. Dimensions Record

Figure 11:
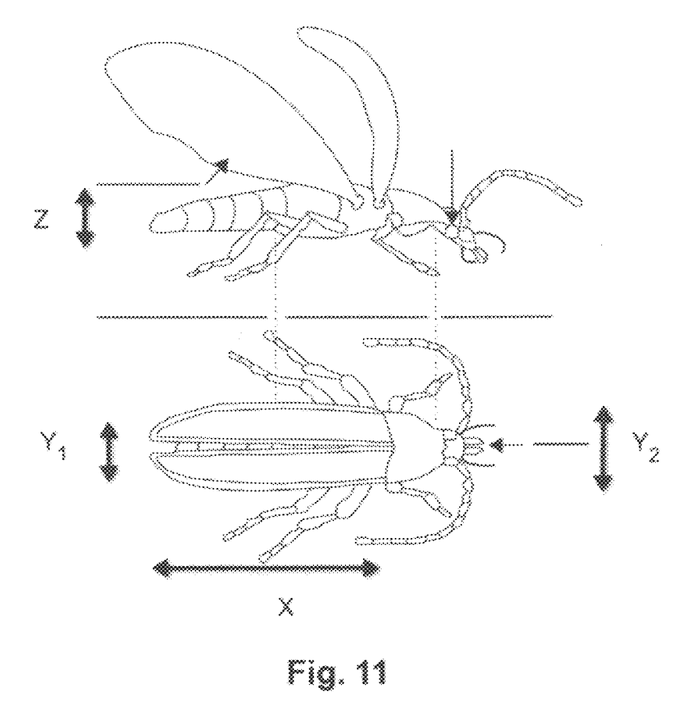
FIG. 11 shows the behavior of different samples when applying 1000 gF in the TA.XT Plus Texture Analyzer from Stable Micro Systems®.

Measurements were made of the section corresponding to the wings, which is the most prominent, and on which compression was performed, in three dimensions, identified as x, y1, y2 and z (FIG. 11). Only at number 7, it was measured including the thorax, for being more prominent than the wings.

Figure 12:
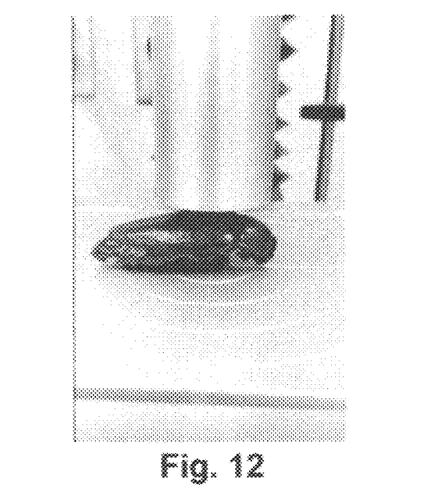
FIG. 12 shows the coleopterous 1b analyzed by compression test with a TA.XT Plus Texture Analyzer from Stable Micro Systems®.

III. Texture Analysis:

Specimen compression tests were performed with a TA.XT Plus Texture Analyzer from Stable Micro Systems®, as shown in FIG. 12, under the following parameters:

Sequence Title: Return to Start (Set Dist)
Test Mode: Compression
Pre-Test Speed: 1.00 mm/sec
Test Speed: 0.50 mm/sec
Post-Test Speed: 10.00 mm/sec
T.A. Variable No: 5: 0.0 g
Target Mode: Strain
Distance: 2.0 mm
Strain: 10.0%
Trigger Type: Auto (Force)
Trigger Force: 100.0 g, 200.0 g, 500.0 g, 1000.0 g
Probe: P/25; 25 mm DIA CYLINDER ALUMINUM
Points per second: 500
Test Run by: LEAH Compression was started with 100 g force and 10% deformation; later it was increased to 200 g, 500 g and 1000 g. At 1000 g, there was already fracture in the structure of some samples, so it no longer increased.

IV. Results and Discussion:

1.—Identification

TABLE 1

Assigned code, observed dimensions (x, y1, y2) in mm, approximate calculated volume (mm3) and image of each of the Coleoptera received for analysis.

| Code | x (mm) | y1 (mm) | y2 (mm) | Z (mm) | Volume (mm³) | Image |
|---|---|---|---|---|---|---|
| 1a | 27.78 | 11.48 | 20.53 | 13.48 | 5993 |  |
| 1b | 34.77 | 7.27 | 14.88 | 12.36 | 4760 |  |
| 1c | 23.33 | 5.00 | 9.16 | 7.61 | 1257 |  |
| 2 | 34.84 | 19.54 | 26.90 | 17.10 | 13834 |  |
| 3a | 10.80 | 5.32 | 6.32 | 3.93 | 247 |  |

TABLE 1-continued

Assigned code, observed dimensions (x, y1, y2) in mm, approximate calculated volume (mm3) and image of each of the Coleoptera received for analysis.

| Code | x (mm) | y1 (mm) | y2 (mm) | Z (mm) | Volume (mm$^3$) | Image |
|---|---|---|---|---|---|---|
| 3b | 9.58 | 5.02 | 6.09 | 4.24 | 226 |  |
| 4 | 14.47 | 6.68 | 10.09 | 10.09 | 843 |  |
| 5 | 17.85 | 8.37 | 17.35 | 9.64 | 2213 |  |
| 6 | 23.18 | 11.88 | 18.21 | 11.46 | 3997 |  |
| 7 | 18.70 | 4.43 | 9.21 | 8.11 | 1034 |  |

The analyzed samples presented different sizes and shapes, so that the comparison between the treatments was not possible directly. Hence, the dimensions of the coleoptera abdomen were taken to calculate an approximate volume of it and to relate it to the applied force through the texture analysis.

2.—Texture Analysis

Table 2 shows the values obtained from the maximum force registered as "Peak Positive Force" (g) when applying a force of 1000 g, which was the one that presented the fracture of some samples, as well as the hardness, Registered as "Mean Area" or area under the curve (g*s), which, in the equipment software, is reported as "Hardness". The shaded rows correspond to those that did not contain filling.

TABLE 2

Values corresponding to maximum force (g) and hardness (g.s) for each of the samples when applying 1000 gF.

| Sample | Maximum force (g) | Hardness (g.s) |
|---|---|---|
| 1a | 17 518.16 | 14 301.35 |
| 1b | 28 858.16 | 24 763.38 |
| 1c | 4 066.25 | 5 526.37 |
| 2 | 12 767.77 | 6 874.47 |
| 3a | 648.94 | 1 072.43 |
| 3b | 788.16 | 1 281.21 |
| 4 | 3 344.11 | 3 693.87 |
| 5 | 14 277.71 | 12 743.69 |
| 6 | 38 101.19 | 34 191.49 |
| 7 | 17 285.07 | 21 263.16 |

Figure 13:
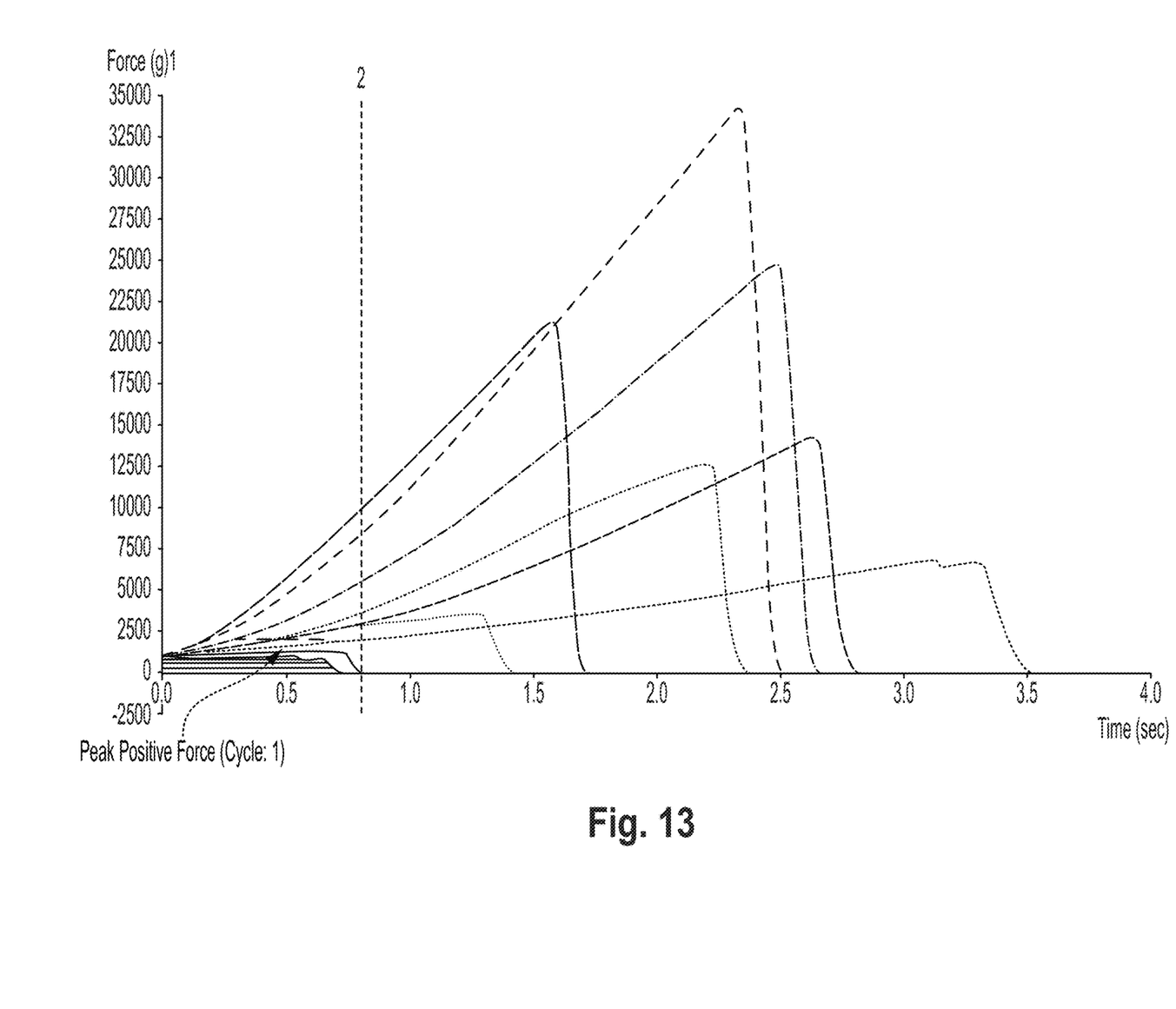
FIG. 13 shows the behavior of the different samples when applying 1000 gF in the TA. XT Plus Texture Analyzer from Stable Micro Systems®.

The graphs corresponding to these conditions, for all the samples, are shown in FIG. 13, where it can be seen that the highest peak with the largest area under curve, corresponds to sample 6, which is not that of higher volume, but it does contain a filler, while the smaller curves, which have the lowest values of strength and hardness, correspond to samples 3a and 3b (which were very similar), of small volume and did not contain filler. In addition, the irregularity of the line shows the fracturability that the samples presented when applying the force and that could also be identified by the sound that was produced.

FIG. 13 shows the behavior of the different samples when applying 1000 gF in the TA.XT Plus Texture Analyzer from Stable Micro Systems®.

In order to find a relationship that would be of better visual identification, the results were separated into two groups: those samples with filling and those that do not contain it, and scatter plots were generated relating the calculated volume with force and hardness (FIGS. 13 and 14), using the same scale for the two groups, for better comparison. In them, it can be seen that the unfilled sample that had the highest volume (13 834 mm3), resisted a force of 12 767 g to present a fracture, while that with a volume of 3 997 mm3, was the most resistant with a force of 38 101 g without fracture.

Figure 14:
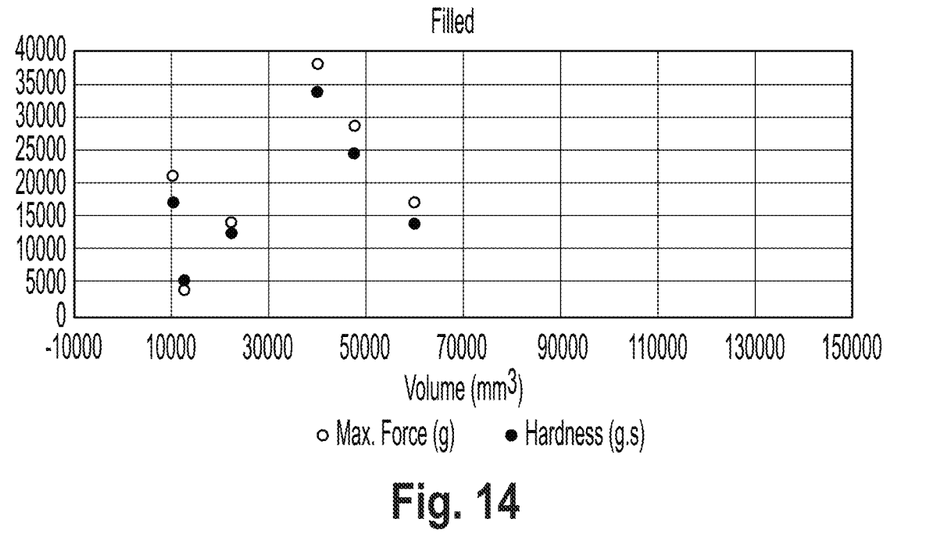
FIG. 14 shows the maximum strength (g) and hardness (g·s) of the filled samples in relation to the calculated volume (mm3).

FIG. 14. Maximum force (g) and hardness (g·s) of the filled samples in relation to the calculated volume (mm3).

Figure 15:
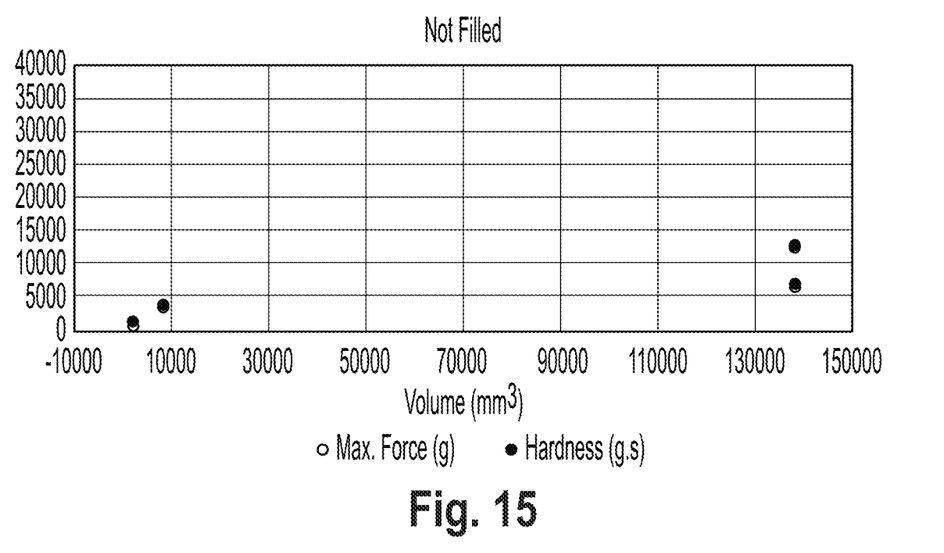
FIG. 15 shows the maximum strength (g) and hardness (g·s) of the unfilled samples in relation to the calculated volume (mm3).

FIG. 15. Maximum force (g) and hardness (g·s) of the samples without filling in relation to the calculated volume (mm3).

Likewise, bar graphs (FIGS. 16 and 17) were generated for each of the samples, to identify more easily, the relationship between volume (mm3), maximum force (g) and hardness (g·s), separately those that contain filling and appreciation of the those without filling for a better values.

It can be seen that samples 3a and 3b showed a very similar behavior, because they were the only two Coleoptera that had almost equal dimensions and appeared to be of the same species Unfortunately both lacked filler, since a better comparison of filler could have been made if one of them had contained it.

Figure 16:
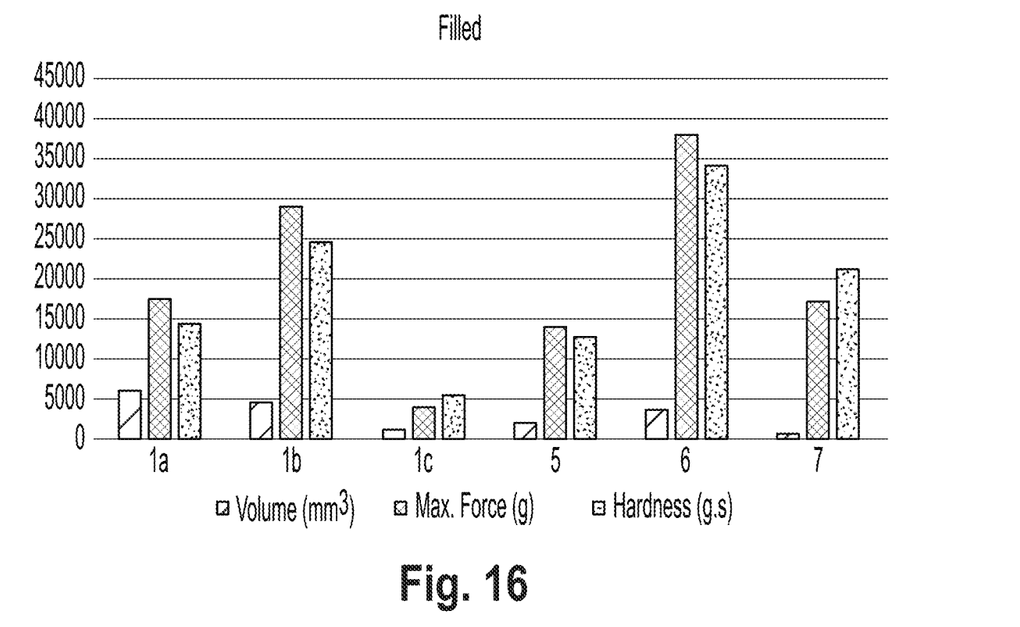
FIG. 16 shows the volume representation (mm3), maximum force (g) and hardness (g·s) of each of the filled samples.
Figure 17:
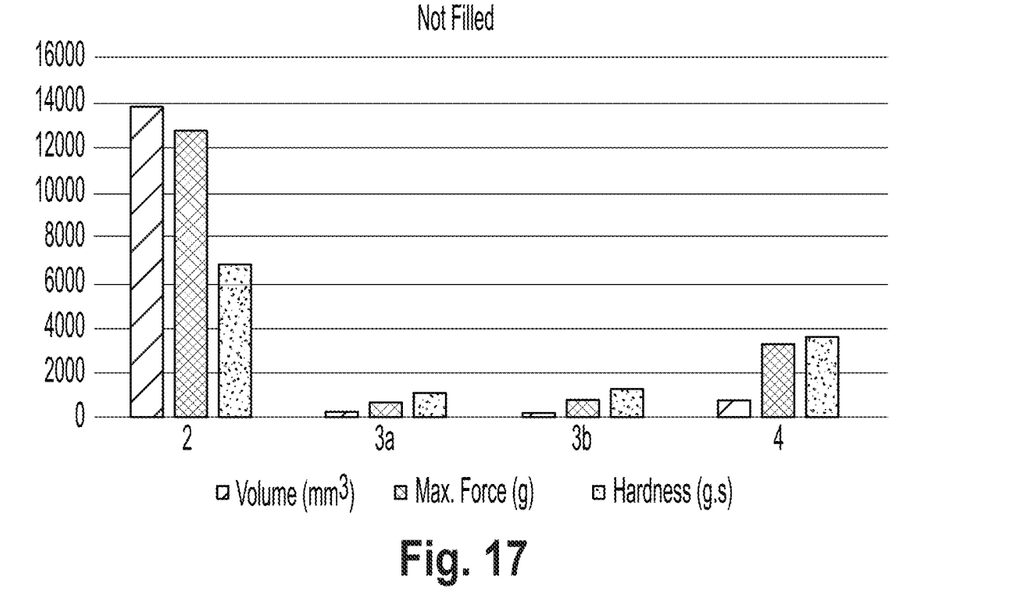
FIG. 17 shows the volume representation (mm3), maximum force (g) and hardness (g·s) of each of the filled samples.

FIG. 16. Volume representation (mm3), maximum force (g) and hardness (g·s) of each of the filled samples. FIG. 17. Volume representation (mm3), maximum force (g) and hardness (g·s) of each of the filled samples.

In a typical texture analysis, the size, shape and structure of the samples are the cause of variability in the results. The obtained values are relative to the nature of each sample.

Using this analysis, it was not possible to make an accurate comparison between a filled and an unfilled sample because the Coleoptera were not equal in size and shape, so the approximate volume of the abdomen was calculated to relate it to the maximum force that they supported and the calculated hardness.

It can be seen graphically that, in proportion, the strength and hardness of the coleoptera is considerably increased in those that have filling, with the filling of samples 6 and 7 showing the greatest increase.

The invention claimed is:

1. An entomological taxidermy process to reinforce a coleopteran exoskeleton comprising steps of:
    sectioning of the coleopteran exoskeleton into: a thorax, an abdomen and a head;
    removing of entrails and a elytra of the abdomen of the coleopteran exoskeleton;
    filling and assembling of the coleopteran exoskeleton;
    reincorporating of the elytra on the coleopteran exoskeleton;
    drying of the coleopteran exoskeleton;
    removing of limbs of the coleopteran exoskeleton; and
    final cleaning of the coleopteran exoskeleton;
    characterized in that during the step of filing and assembling of the coleopteran exoskeleton, two mixtures are used to fill the coleopteran exoskeleton:
    a first mixture of marble powder and pigment-free varnish solution (A), and
    a second mixture of cellulose and pigment-free varnish solution (B).

2. The entomological taxidermy process to reinforce the coleopteran exoskeleton in accordance with claim 1 wherein the first mixture to fill the coleopteran exoskeleton is prepared by mixing two parts of marble powder with one part of pigment-free varnish solution to generate a thick mixture 2:1 (A); and the second mixture to fill the coleopteran exoskeleton is prepared by mixing one part of cellulose with one part of the pigment-free varnish solution 1:1 (B).

3. The entomological taxidermy process to reinforce the coleopteran exoskeleton in accordance with claim 1, wherein during the step of removing entrail of the abdomen of the coleopteran exoskeleton, includes not perforating the abdomen of the coleopteran exoskeleton.

4. The entomological taxidermy process to reinforce the coleopteran exoskeleton in accordance with claim 1, wherein the filling and assembly step of the coleopteran exoskeleton further includes:
    filling at least ¾ an abdominal space of the coleopteran exoskeleton with the first mixture of marble powder and pigment-free varnish solution;
    filling with the second mixture of cellulose and pigment-free varnish solution until at least ¼ of a remaining abdominal space of the coleopteran exoskeleton is filled and until the second mixture is exposed;
    mounting the coleopteran exoskeleton thorax to the coleopteran exoskeleton abdomen, a union of two parts of exoskeleton is produced by the exposed second mixture of cellulose and pigment-free varnish solution;
    filling at least ⅔ of the coleopteran exoskeleton thorax space with the first mixture of marble powder and pigment-free varnish solution;
    subsequently filling at least ¼ of the coleopteran exoskeleton thorax space with the second mixture of cellulose and pigment-free varnish solution;
    leaving the second mixture exposed so that the coleopteran exoskeleton thorax can fit with the coleopteran exoskeleton head;
    filling the coleopteran exoskeleton head with the second mixture of cellulose and pigment-free varnish solution until said second mixture is exposed to fit with the coleopteran exoskeleton thorax; and
    fitting the coleopteran exoskeleton head with the coleopteran exoskeleton thorax and pressing at least 10 to 60 seconds to join the three parts.

5. The entomological taxidermy process to reinforce the coleopteran exoskeleton in accordance with claim 1, wherein the reincorporating elytra step of the coleopteran exoskeleton further includes:
    with the second mixture of cellulose and pigment-free varnish solution, placing in layers in coleopteran upper abdomen where the coleopteran exoskeleton elytra were previously located and placing the second mixture to obtain a thickness of the coleopteran exoskeleton elytra; and
    reincorporating the coleopteran exoskeleton elytra on the coleopteran abdomen, respecting coleopteran exoskeleton anatomy.

6. The entomological taxidermy process to reinforce the coleopteran exoskeleton according to claim 1 wherein the drying step of the coleopteran exoskeleton is performed between 1 to 7 days.

7. The entomological taxidermy process to reinforce the coleopteran exoskeleton in accordance with claim 1 wherein the limb removing step of the coleopteran exoskeleton is performed by applying force on coleopteran exoskeleton limbs to manually remove anterior, median and posterior limbs.

8. The entomological taxidermy process to reinforce the coleopteran exoskeleton in accordance with claim 1, wherein the final cleaning step of the coleopteran exoskeleton further includes:
    immersing a cotton swab in a solution of pink aniline (vegetable), glycerin, mineral oil, butyl acetate and rub coleopteran joints and any part where there is excess of the mixture; and
    with assistance of a removal tool, removing the excess of the second mixture when protruding from the coleopteran joints, previously rubbing with the pink aniline (vegetable), glycerin, mineral oil, butyl acetate solution.

* * * * *